(12) United States Patent
Kesiraju et al.

(10) Patent No.: US 11,768,690 B2
(45) Date of Patent: *Sep. 26, 2023

(54) COPROCESSOR CONTEXT PRIORITY

(71) Applicant: Apple Inc., Cupertino, CA (US)

(72) Inventors: Aditya Kesiraju, San Jose, CA (US); Andrew J. Beaumont-Smith, Cambridge, MA (US); Brian P. Lilly, San Francisco, CA (US); James Vash, San Ramon, CA (US); Jason M. Kassoff, Denver, CO (US); Krishna C. Potnuru, San Jose, CA (US); Rajdeep L. Bhuyar, Santa Clara, CA (US); Ran A. Chachick, Providence, RI (US); Tyler J. Huberty, Sunnyvale, CA (US); Derek R. Kumar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/532,072

(22) Filed: Nov. 22, 2021

(65) Prior Publication Data

US 2022/0083343 A1 Mar. 17, 2022

Related U.S. Application Data

(63) Continuation of application No. 17/018,963, filed on Sep. 11, 2020, now Pat. No. 11,210,104.

(51) Int. Cl.
*G06F 9/38* (2018.01)
*G06F 11/30* (2006.01)
*G06F 9/30* (2018.01)
*G06F 9/48* (2006.01)

(52) U.S. Cl.
CPC .......... *G06F 9/3877* (2013.01); *G06F 9/3009* (2013.01); *G06F 9/3836* (2013.01);
(Continued)

(58) Field of Classification Search
CPC .... G06F 9/3836; G06F 9/3851; G06F 9/3877; G06F 9/3879; G06F 9/3881; G06F 9/4881

See application file for complete search history.

(56) References Cited

U.S. PATENT DOCUMENTS 6,032,218 A 2/2000 Lewin et al.
6,829,697 B1 * 12/2004 Davis .................. G06F 15/7864
718/103

(Continued)

*Primary Examiner* — William B Partridge
(74) *Attorney, Agent, or Firm* — Kowert, Hood, Munyon, Rankin & Goetzel, P.C.

(57) ABSTRACT

A system may include a plurality of processors and a coprocessor. A plurality of coprocessor context priority registers corresponding to a plurality of contexts supported by the coprocessor may be included. The plurality of processors may use the plurality of contexts, and may program the coprocessor context priority register corresponding to a context with a value specifying a priority of the context relative to other contexts. An arbiter may arbitrate among instructions issued by the plurality of processors based on the priorities in the plurality of coprocessor context priority registers. In one embodiment, real-time threads may be assigned higher priorities than bulk processing tasks, improving bandwidth allocated to the real-time threads as compared to the bulk tasks.

20 Claims, 10 Drawing Sheets

(52) U.S. Cl.
    CPC .......... *G06F 9/3863* (2013.01); *G06F 9/3881* (2013.01); *G06F 9/4887* (2013.01); *G06F 11/3024* (2013.01); *G06F 9/3879* (2013.01)

(56) References Cited

U.S. PATENT DOCUMENTS

| | | | |
|---|---|---|---|
| 6,901,488 B2 * | 5/2005 | Gruner | G06F 12/0831 |
| | | | 711/119 |
| 7,360,217 B2 * | 4/2008 | Melvin | G06F 9/3891 |
| | | | 712/E9.071 |
| 7,395,361 B2 | 7/2008 | Schaffer et al. | |
| 7,631,130 B2 | 12/2009 | Jensen | |
| 7,974,996 B1 * | 7/2011 | North | G06F 9/3885 |
| | | | 708/524 |
| 8,006,244 B2 * | 8/2011 | Davis | G06F 9/3851 |
| | | | 718/100 |
| 8,990,498 B2 | 3/2015 | Sukonik et al. | |
| 10,182,236 B2 * | 1/2019 | Susnow | H04N 19/176 |
| 10,360,168 B1 * | 7/2019 | Griffin | G06F 12/1027 |
| 11,210,104 B1 | 12/2021 | Kesiraju et al. | |
| 2002/0083251 A1 * | 6/2002 | Chauvel | G06F 1/3203 |
| | | | 711/E12.07 |
| 2006/0168428 A1 * | 7/2006 | Alsup | G06F 9/4818 |
| | | | 712/228 |
| 2006/0179196 A1 * | 8/2006 | Gray | G06F 13/14 |
| | | | 710/240 |
| 2016/0048396 A1 * | 2/2016 | Wiencke | G06F 9/3838 |
| | | | 712/34 |
| 2020/0050451 A1 * | 2/2020 | Babich | G06T 1/20 |

* cited by examiner

Thread Info Table

| Thread ID | Deadline | ... |
|---|---|---|
| Thread ID | Deadline | ... |
| Thread ID | Priority | ... |
| Thread ID | Priority | ... |
| ⋮ | | |
| Thread ID | Deadline | ... |

— 20

Hardware Context Priority Table

| Thread ID | Priority |
|---|---|
| Thread ID | Priority |
| ⋮ | |
| Thread ID | Priority |

— 22

Hardware Context Priority to Weight Index Mapping

| Priority | Index |
|---|---|
| 255-224 | 0 |
| 223-160 | 1 |
| 159-96 | 2 |
| 95-64 | 3 |
| 63-32 | 4 |
| 31-16 | 5 |
| 15-0 | 6 |

| Rsvd | W6 | W5 | W4 | W3 | W2 | W1 | W0 |

COPROCESSOR CONTEXT PRIORITY

This application is a continuation of U.S. patent application Ser. No. 17/018,963, filed on Sep. 11, 2020. The above application is incorporated herein by reference in its entirety.

BACKGROUND

Technical Field

Embodiments described herein are related to processors and coprocessors and, more particularly, to sharing a coprocessor among multiple processors.

Description of the Related Art

General-purpose processors are used as central processing units (CPUs) in digital systems such as computers, portable devices such as smart phones, personal digital assistants (PDAs), and other electronic devices. The general-purpose processor can also be used as a microcontroller for other general control functions in a digital system, such as in peripheral devices in the system. General-purpose processors can be optimized for performance and/or power efficiency when performing general-purpose computing tasks. In some cases, however, a coprocessor can be included that is optimized for a more specific task (e.g., wide parallel computations on vectors or matrices, as are often common in neural network processing or other machine learning tasks, other convolution tasks or large scale vector/matrix processing tasks, computations on a specific operand type such as floating-point or vector, graphics processing, video processing, audio processing, digital signal processing, etc.).

Typically, coprocessors execute instructions that are included in the instruction stream of a program or thread being executed by the processors. The processors can detect the coprocessor instructions and issue them to the coprocessors. Thus, the thread can include a mix of coprocessor instructions and processor instructions.

In some cases, a coprocessor can be shared by multiple processors. That is, several processors can concurrently issue instructions to the coprocessor. When the coprocessor is shared, an arbitration mechanism is needed to determine which instructions are executed first. Additionally, in some cases, some threads are more important to the overall workload of the system (e.g., real time threads that need to finish within a specific time frames, as compared to bulk processing for machine learning, for example).

SUMMARY

In an embodiment, a system is contemplated including a plurality of processors and a coprocessor coupled to the plurality of processors. A plurality of coprocessor context priority registers may be included, corresponding to a plurality of contexts supported by the coprocessor. The plurality of processors may use the plurality of contexts, and may program the coprocessor context priority register corresponding to a context with a value specifying a priority of the context relative to other contexts. An arbiter may arbitrate among instructions issued by the plurality of processors based on the priorities of the plurality of coprocessor context priority registers, giving more execution bandwidth to higher priority contexts than to lower priority contexts over time. During times that higher priority contexts are not issuing many instructions, however, the bandwidth that is not consumed by the higher priority contexts may be available to the lower priority contexts. In one embodiment, real-time threads may be assigned higher priorities than bulk processing tasks, improving bandwidth allocated to the real-time threads as compared to the bulk tasks.

BRIEF DESCRIPTION OF THE DRAWINGS

The following detailed description refers to the accompanying drawings, which are now briefly described.

Figure 1:
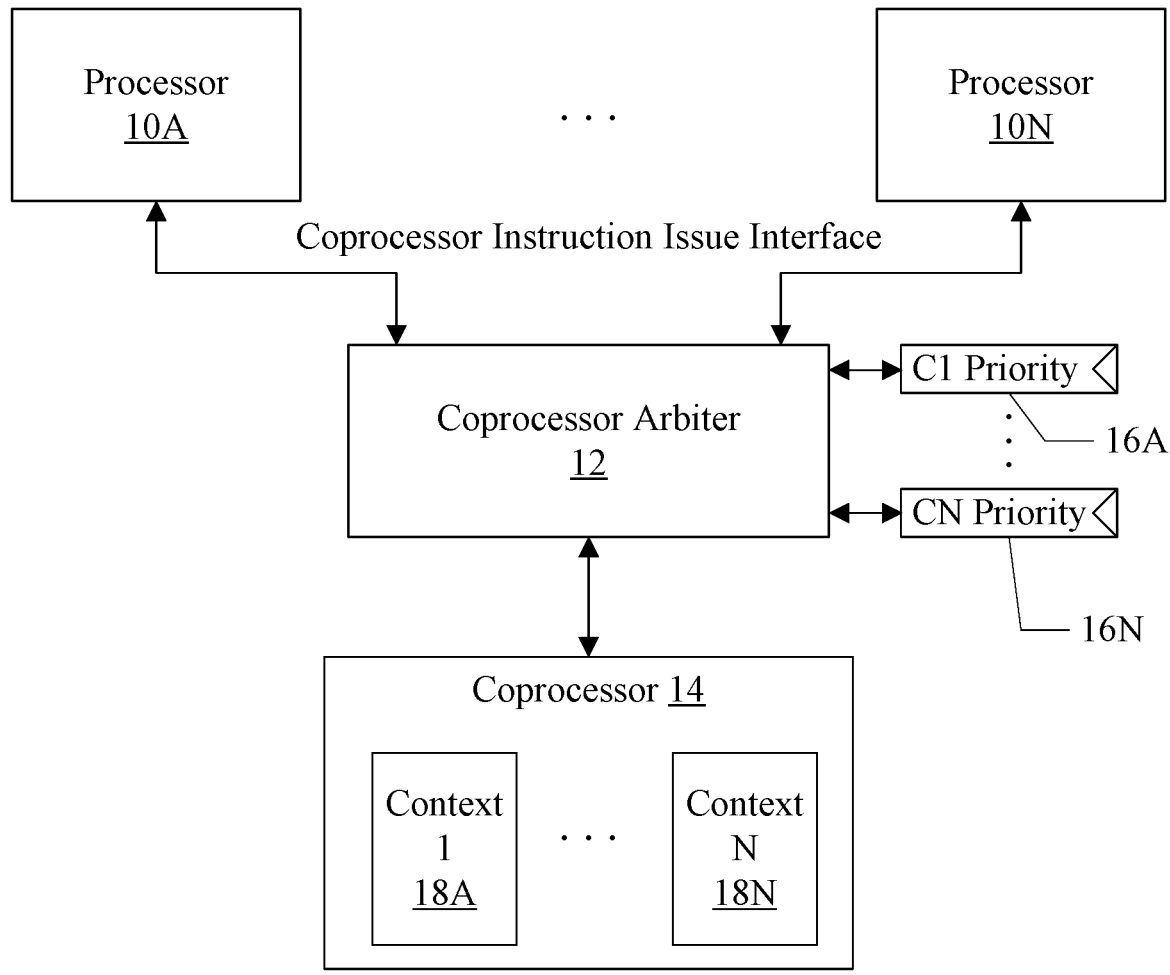
FIG. 1 is a block diagram of one embodiment of a processor cluster including a coprocessor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a processor cluster including a plurality of processors 10A-10N, a coprocessor arbiter 12, a coprocessor 14, and a plurality of coprocessor context priority registers 16A-16N is shown. The processors 10A-10N are coupled to the coprocessor arbiter 12, which is coupled to the coprocessor context priority registers 16A-16N. The coprocessor 14 includes a plurality of contexts (shown as context 1 to context N, reference numerals 18A-18N), and there may be a respective coprocessor context priority register 16A-16N for each context 18A-18N. It is noted that the illustration in FIG. 1 is a high level, logical illustration and the actual implementation may vary. For example, in an embodiment, the coprocessor context priority registers 16A-16N may be implemented in the coprocessor 14, and the current values (or weights corresponding to the values, for an embodiment described in more detail below) may be transmitted to the coprocessor arbiter 12.

Each context 18A-18N may include the complete state of the coprocessor 14 that is applicable to a given instruction stream. That is, when an instruction executes on the coprocessor 14 and completes, the coprocessor 14 may have a given state that reflects the execution of the instruction and any preceding instructions in the same instruction sequence (e.g., thread). The next instruction from the instruction sequence to be executed by the coprocessor 14 would execute using that state. For example, the state may include input and output memory contents for operands (e.g., the equivalent of general purpose registers in a processor). Some general configuration registers in the coprocessor 14 may not be duplicated for each context if those registers are the same across the contexts. By supporting multiple contexts, instructions from more than one instruction stream may be executed by the coprocessor 14 without requiring the saving and restoring of the context in between instructions from different instruction streams. Instead, state from the corresponding context may be accessed/updated by the coprocessor 14 to execute a given instruction. Thus, the coprocessor 14 may support up to N contexts without needing to perform a context switch between executing instructions from the different contexts. A context switch may generally involving saving that current context state (e.g., to a memory location in a memory system in the system that includes the processor cluster of FIG. 1) and loading the context of the newly-executing code sequence (e.g., from another memory location, or if the newly-executing code sequence is initializing, an initial context for the coprocessor 14).

By providing multiple contexts, the same execution hardware in the coprocessor 14 may be shared across the multiple threads corresponding to the context. Accordingly, instructions from the different threads may be interleaved in the coprocessor 14, referred to as simultaneous multi-threading. Each instruction may use state from its corresponding context, and may generally be independent of instructions from other threads except for the sharing of the execution hardware. The coprocessor 14 may implement one pipeline that is shared by the threads, or multiple pipelines to which instructions may be dispatched. The multiple pipelines may be symmetrical (any instruction may be issued to any pipeline) or asymmetrical (different pipeline execute different subsets of instructions), or any combination of symmetrical and asymmetrical pipelines.

In the illustrated embodiment, there are N contexts and N processors, and thus there may be a context available to each processor if each processor 10A-10N uses the coprocessor 14. Alternatively, two or more contexts may be used by threads executing on a given processor 10A-10N, especially if another of the processors 10A-10N is not using the coprocessor 14 for the threads that the other processor is executing. Other embodiments may implement different numbers of contexts than the number of processors (e.g., more or fewer contexts than the number of processors).

While there are N contexts and N processors in the illustrated embodiment, there is not necessarily a one-to-one correspondence between a context and a processor. That is, the processor 10A may not always be using context 18A, and the processor 10N may not always be using the context 18N. Instead, a thread identifier or the like may be used to identify the thread and may be assigned to one of the contexts 18A-18N when the thread first uses the coprocessor 14 (e.g., whichever context 18A-18N is available at that time). The coprocessor 14 may associate the thread identifier with the assigned context 18A-18N to determine which context 18A-18N should be used when a given instruction is executed from that thread. Accordingly, coprocessor instructions from different threads may be intermingled in execution win the coprocessor 14, and the thread identifier for each instruction may be used to select the correct context from which to read source operands to which result data is written. Furthermore, a thread may migrate from processor to processor, and the thread ID may automatically reference the correct context, in an embodiment. In other embodiments, a one-to-one correspondence between processors 10A-10N and contexts 18A-18N/context priority registers 16A-16N may be fixed in hardware.

As shown in FIG. 1, the processors 10A-10N may have a coprocessor instruction issue interface on which coprocessor instructions may be transmitted to the coprocessor arbiter 12. The interface may have any definition. For example, instructions may be transmitted individually over the coprocessor instruction issue interface. In an embodiment, a processor 10A-10N may accumulate instructions in a bundle (e.g., up to a cache line full of instructions, unless the bundle is closed due to expiration of a timer or other bundle closing conditions) and transmit the bundle over the interface. The coprocessor arbiter 12 may have one or more queues or may be coupled to one or more queues to capture instructions/bundles from the processors 10A-10N and store them until the coprocessor arbiter 12 selects the instructions/bundles to be transmitted to the coprocessor 14.

The coprocessor arbiter 12 may implement any arbitration scheme that takes into account the context priorities in the registers 16A-16N to allocate proportionally more execution bandwidth in the coprocessor 14 to instructions from higher priority threads than to lower priority threads over time, assuming the same number of instructions/bundles transmitted by the thread. If a higher priority thread is not issuing as many instructions/bundles as a lower priority thread, the instructions/bundles from the higher priority thread may be selected relatively quickly but the lower priority thread may be permitted to use the unused bandwidth and thus may actually receive more bandwidth in this case even though the higher priority thread is favored. The coprocessor arbiter 12 may thus distribute coprocessor execution bandwidth to threads at a fine-grain level (e.g., on an instruction by instruction basis, or bundle by bundle bases).

For example, in an embodiment, the context priorities may be mapped to weights in a weighted round-robin mechanism. The weights may cause the higher priority threads to be selected more often than the low priority threads when instructions from both threads are available. When a thread/context is selected by the arbiter 12 and sends one or more instructions to the coprocessor 14, a counter corresponding to the thread/context may be incremented by the weight. When a counter exceeds a specified threshold, the counters may be right shifted to halve their values. Over time, this mechanism may tend to allocate more bandwidth to lower weights (which are mapped to higher priorities) based on the inverse of the weights relative to each other.

Generally, a coprocessor may include any circuitry that is designed to perform a specified subset of instructions from a processor's instruction set. That is, the coprocessor instructions may be intermingled with instructions that are executed directly by the processor. The processor may detect the coprocessor instructions and may issue the coprocessor instructions to the coprocessor for execution. The coprocessor may independently execute the coprocessor instructions, and there may generally be no indication back to the processor when the instructions have completed. The coprocessor may generally include circuitry to decode the coprocessor instructions, schedule the coprocessor instructions for execution, provide operand storage for source operands and results, and execute the instructions. In some cases, a coprocessor may include specialized circuitry that accelerates the execution of the coprocessor instructions. The processor may be relieved of any need to implement the specialized circuitry, which may permit the processor to be more efficient. If coprocessor instructions are not used, the coprocessor may be clock gated or powered off, further improving efficiency for such embodiments.

Accordingly, in some embodiments, a system (e.g., a digital system such as a computer system, smart phone, or other personal digital assistant) may include a plurality of processors; a coprocessor coupled to the plurality of processors; a plurality of coprocessor context priority registers, and an arbiter coupled to the plurality of processors and the coprocessor. The coprocessor may be configured to execute coprocessor instructions transmitted by the plurality of processors. The coprocessor instructions are included in threads with processor instructions to be executed by the plurality of processors. The coprocessor includes a plurality of contexts to permit simultaneous multi-threaded execution on the coprocessor. A given coprocessor context priority register of the plurality of coprocessor context priority registers corresponds to a respective context of the plurality of contexts, and a context priority programmed into the given coprocessor context priority register specifies a priority of a thread executing in the respective context for execution bandwidth on the coprocessor. The arbiter may be configured to arbitrate between coprocessor instructions from the plurality of processors to select coprocessor instructions to be transmitted to the coprocessor for execution based on the context priorities programmed into the plurality of coprocessor context priority registers.

Using the coprocessor context priority registers, various threads may be programmed to be higher priority than other threads. For example, some systems may include significant real time tasks and threads implementing real time behaviors may be prioritized over threads that are bulk processing or other non-real time workloads. Generally, a real time workload may have the notion of a deadline by which a given thread is to complete, or an error in the real time task will result. For example, a video frame rendering (e.g., by a graphics processing unit) may need to be completed prior to the point in time at which the frame is to be displayed, because if the frame is not complete then the visual images displayed to the user may have a noticeable error in them (e.g., frame drops, pixelation or other erroneous visual artifacts in the frame, "jerkiness" in a video, etc.). Similarly, video decoders may need to maintain a frame rate, audio processing may have deadlines, etc.

Figure 2:
FIG. 2 is a block diagram of one embodiment of a thread information table and a hardware context priority table.

FIG. 2 is a block diagram of one embodiment of a thread information table 20 and a hardware context priority table 22 that may be used by software (e.g., the operating system) to program the coprocessor context priority registers 16A-16N for an embodiment. The thread information table 20 may store various information regarding threads that may be used to determine the hardware priority for the threads. For example, some entries in the thread information table 20 may include deadline information, such as the amount of time in which one iteration of the thread is to finish to provide proper operation. Other entries may include a priority for the thread directly. Each entry may be labeled with a thread identifier (e.g., a name of the thread, or other identifier). As indicated by the arrow, the operating system may process the thread information table to generate the hardware context priority table 22. The thread identifier in the hardware context priority table 22 may be an identifier that is used to identify the thread during operation, and may be different from the thread identifier stored in the thread information table 20. The priority may be the priority to program into the coprocessor context priority register 16A-16N when the thread is launched or scheduled for execution, for example.

For threads that have deadlines in the thread information table 20, any mechanism for mapping deadlines to priorities may be used. For example, an earliest deadline first model may be used to map the shortest deadlines to higher priorities than the longer deadlines. For threads that have priorities in the thread information table 20, the priorities may be directly copied to priorities in the hardware context priority table 22 or may be mapped to priorities in the hardware context priority table via any transformation operation.

Figure 3:
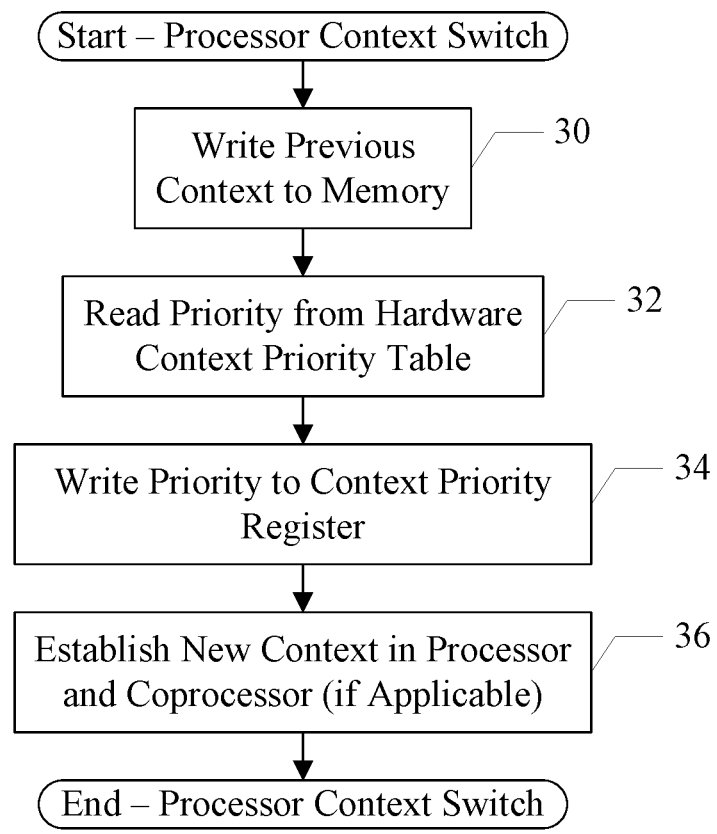
FIG. 3 is a flowchart illustrating one embodiment of a context switch in a processor.

FIG. 3 is a flow chart illustrating one embodiment of updating the coprocessor context priority registers during a context switch on a processor 10A-10N. While the blocks are shown in a particular order, other orders may be used. Context switch software, such as operating system software, may include instructions which, when executed (e.g., on a processor 10A-10N), implement the operation shown in FIG. 3.

The context switch software may write the current context (e.g., various processor register values) to memory to save the context (block 30). In an embodiment, context from the coprocessor 14 may be saved as well if the coprocessor 14 was in use by the thread corresponding to the context.

If the newly-scheduled thread (e.g., the thread being switched to in the processor 10A-10N) uses the coprocessor 14, the context switch software may read the priority for the newly scheduled thread from the hardware context priority table 22 (block 32) and may write the priority to the coprocessor context priority register assigned to the processor 10A-10N that will be executing the newly-scheduled thread (block 34). The context switch software may also establish the new context corresponding to the newly-scheduled thread in the processor 10A-10N and the coprocessor 14 (if applicable) (block 36). In the case of the coprocessor 14, the context may be established in the operand memories in a section corresponding to the assigned context for the newly-scheduled thread.

Thus, during a context switch to a first context on a first processor of the plurality of processors, a second plurality of instructions executed by the first processor (e.g., the context switch software) may cause the first processor to write a first context priority corresponding to the first context to a first coprocessor context priority register of the plurality of coprocessor context priority registers, wherein the first coprocessor context priority register corresponds to the first processor (e.g., is currently assigned to the first processor).

Figure 4:
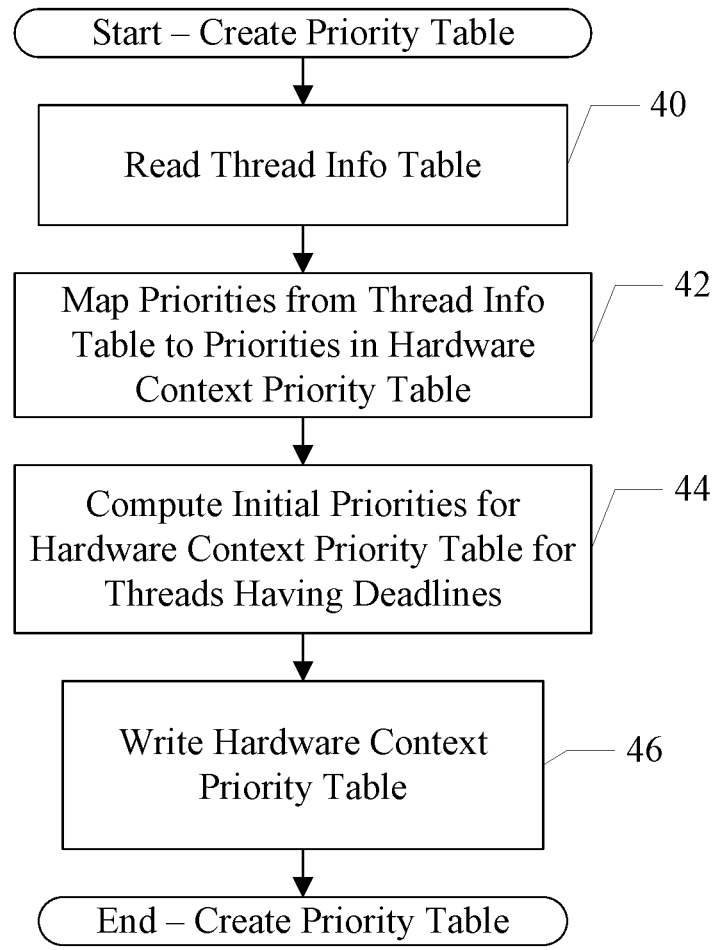
FIG. 4 is a flowchart illustrating one embodiment of generating a hardware context priority table from thread information.

FIG. 4 is a flowchart illustrating one embodiment of creating the hardware context priority table 22. The hardware context priority table 22 may be generated during system initialization, for example, by the operating system software and/or boot software. While the blocks are shown in a particular order, other orders may be used. The software may include instructions which, when executed (e.g., on a processor 10A-10N), implement the operation shown in FIG. 4.

The software may read the thread information table 20, identifying the threads that may be executed during operation of the system (block 40). The software may map the priorities in the thread information table 20 to priorities for the hardware context priority table 22, and may write the mapped priorities to the hardware context priority table (block 42). Thus, a thread of the plurality of threads having a software-assigned priority, may have a corresponding initial priority of an initial plurality of priorities that is mapped from the software-assigned priority. The mapping may simply involve copying the priorities from the thread information table 20 to the hardware context priority table 22, or may include modifying the priorities in some fashion, in various embodiments.

For those threads having deadlines, the software may compute initial priorities relative to the other priorities as well as the model for scheduling the threads having deadlines (block 44). The initial priorities may be static priorities used throughout the operation of the system, or may be dynamically adjusted during operation as discussed in more detail below. Thus, a first thread of the plurality of threads having a deadline for completion may have a first priority of the initial plurality of priorities in the hardware context priority table 22 that is derived from the deadline associated with the first thread.

The software may write the priorities and thread identifiers to the hardware context priority table 22 (block 46). Thus, as illustrated in FIG. 4, the software may program an initial plurality of priorities corresponding to a plurality of threads that include coprocessor instructions. The initial priorities may be recorded in a table (e.g., the hardware context priority table 22) from which the plurality of coprocessor context priority registers are programmed when corresponding threads of the plurality of threads are executed on the plurality of processors.

Figure 5:
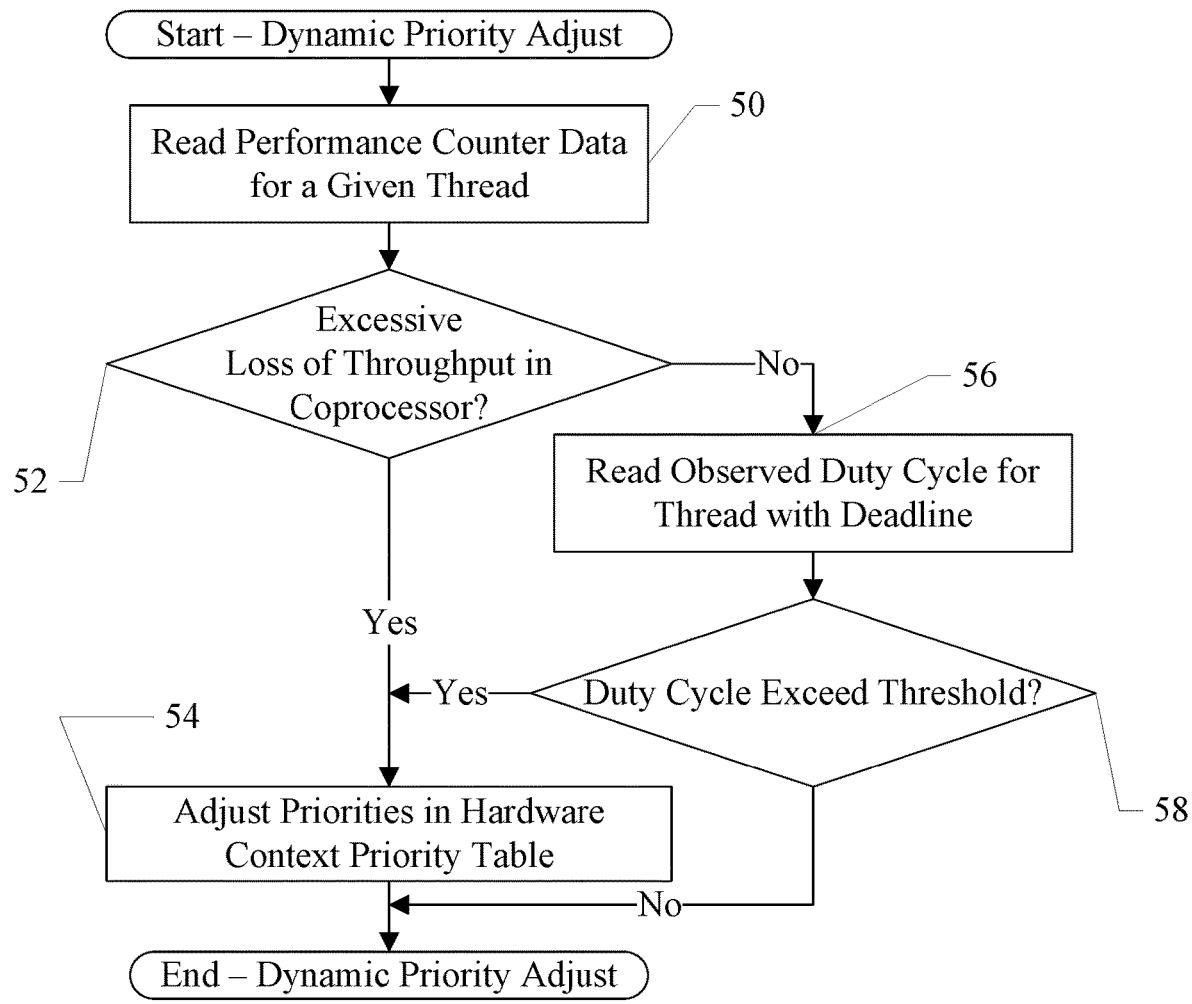
FIG. 5 is a flowchart illustrating one embodiment of dynamically updating priorities in a hardware context priority table.

FIG. 5 is a flowchart illustrating one embodiment of dynamically adjusting the priorities in the hardware context priority table 22. While the blocks are shown in a particular order, other orders may be used. The software implementing the operation of FIG. 5 may include instructions which, when executed (e.g., on a processor 10A-10N), implement the operation shown in FIG. 5.

Generally, the dynamic adjustment may be performed by monitoring operation of the plurality of threads during execution, and modifying one or more of the initial plurality of priorities based on the operation (e.g., if performance expectations are not being met, such as real time threads meeting their deadlines. Priorities of threads that are not meeting performance expectations may be increased, or the priority of other threads that do not have performance issues may be decreased so that the threads that are not meeting performance expectations may receive more execution bandwidth in the coprocessor 14. Both increase and decrease of priorities may be implemented, as desired. The adjustment may be performed periodically during execution of the threads in the system.

In an embodiment, the performance of the threads may be measured using performance counters associated with the processors. The performance counters may be hardware circuitry that counts events or other attributes of instruction execution in the processors 10A-10N. For example, counters in the processors 10A-10N may measure execution time (e.g., in clock cycles or based on time stamps) for execution of the threads, and may compare the execution times to the deadlines. Alternatively, or in addition, performance counters may measure throughput in the coprocessor 14 for the coprocessor instructions in the thread.

Accordingly, software may read the performance counter data associated with a given thread (block 50). If the performance counter data indicates that the thread has had excessive loss of throughput in the coprocessor 14 (e.g., above a threshold level, decision block 52, "yes" leg), the software may adjust the priorities in the hardware context priority table 22 (e.g., increasing the priority of the given thread and/or decreasing priorities of other threads—block 54). If the performance counter data does not indicate that the thread has had an excessive loss of throughput (decision block 52, "no" leg), the software may read an observed duty cycle of the thread (e.g., the amount of time that the thread executes compared to the deadline for the thread) (block 56). If the duty cycle exceeds a threshold (decision block 58, "yes" leg), the software may adjust priorities in the hardware context priority table (e.g., increasing the priority of the given thread and/or decreasing priorities of other threads—block 54). Viewed in another way, one or more of the initial plurality of priorities may be modified based on a given thread completing execution within a threshold of the deadline (e.g., near the deadline). In this example, the nearness to the deadline (e.g., the threshold) may be determined based on the average observed duty cycle for the given thread.

Figure 6:
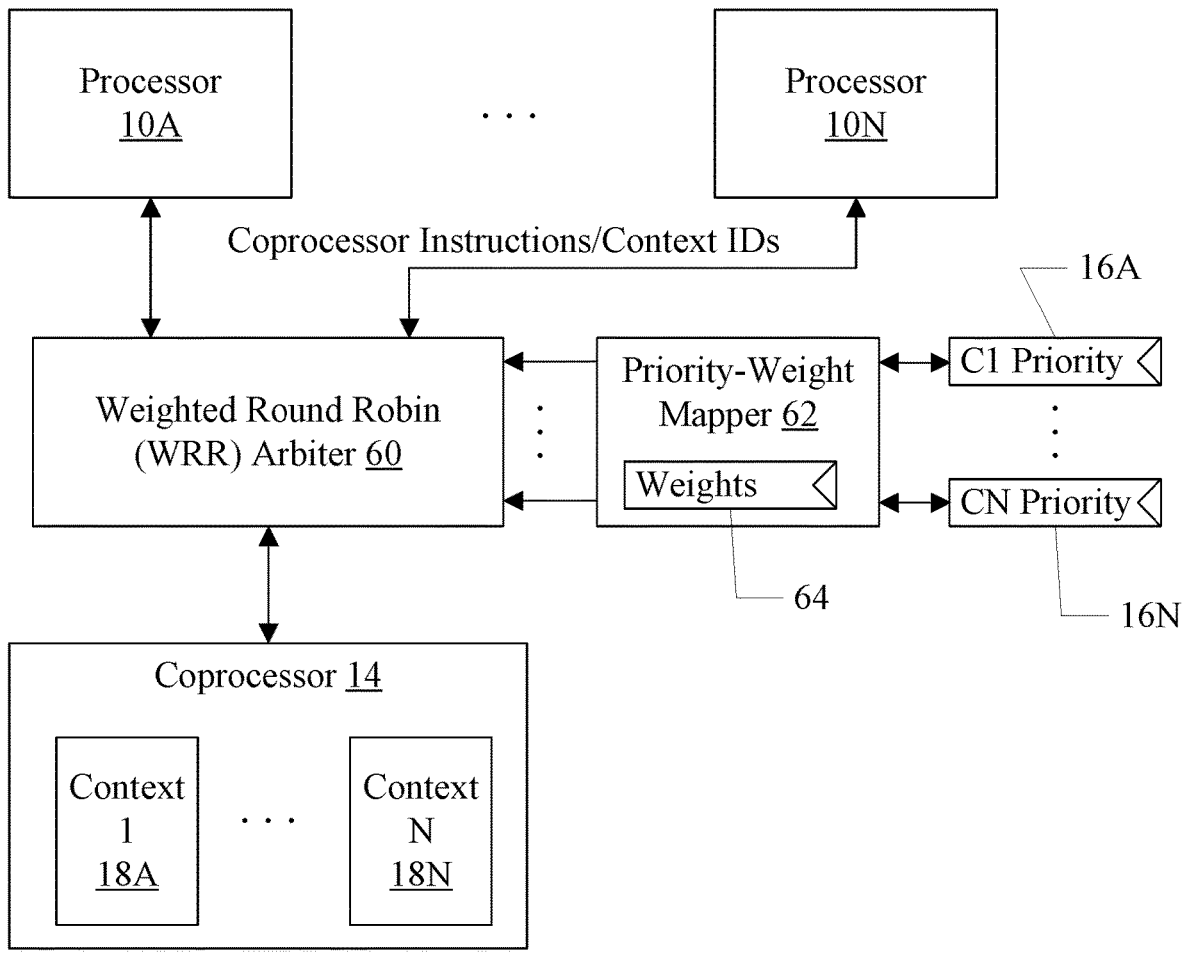
FIG. 6 is a block diagram of one embodiment of a processor cluster in greater detail.

FIG. 6 is a block diagram of one embodiment of a processor cluster in greater detail. The processor cluster may include the processors 10A-10N, the coprocessor context priority registers 16A-16N, and the coprocessor 14 (including contexts 18A-18N) similar to the embodiment of FIG. 1. The processor cluster in FIG. 6 includes a weighted round robin (WRR) arbiter 60 and a priority-weight mapper 62. The priority-weight mapper 62 includes a weights register 64, and is coupled to the coprocessor context priority registers 16A-16N and the WRR arbiter 60. The embodiment of FIG. 6 may be a high level, logical view of the components, and the components may be physically implemented in any fashion. For example, the coprocessor context priority registers 16A-16N may be physically implemented in the coprocessor 14. In an embodiment, the priority-weight mapper 62 may be physically implemented in the coprocessor 14 as well, or in other embodiments may be part of the coprocessor arbiter 12. The WRR arbiter 60 may be physically implemented in the coprocessor arbiter 12, in an embodiment.

The processors 10A-10N may be coupled to the WRR arbiter 60 with a coprocessor instruction issue interface, which in this embodiment may include one or more coprocessor instructions and corresponding context IDs. In one embodiment, if more than one instruction is issued from a given processor 10A-10N concurrently, the instructions may be from the same context and thus there may be one context ID per one or more instructions concurrently issued by the given processor 10A-10N.

The WRR arbiter 60 may include one or more queues for instructions from the processors 10A-10N, and may arbitrate among the queues/instructions to determine which instructions will be issued to the coprocessor 14. In a non-weighted round-robin arbiter, each source being arbitrated may be given an equal chance to be highest priority request and thus ensure selection if that source has a request. A weighted round-robin arbiter modifies the equal chance, allowing a first source to be given more or fewer opportunities to be higher priority that a second source based on a ratio of the weights assigned to the first source and the second source.

In one embodiment, the WRR arbiter 60 implementation may have an inverse correlation of the weights to the frequency at which the requestors may be picked. That is, a lower numerical value for the weight corresponds to more frequent selection and thus a higher priority. Accordingly, the priority-weight mapper 62 may be provided and may be configured to map the context priorities from the plurality of coprocessor context priority registers to a plurality of weights. In the illustrated embodiment, the weights register 64 may be used to map the priorities to weights. That is, the priorities in the coprocessor context priority registers 16A-16N may be used as an index into fields in the weights register 64, and the priority-range mapper 62 may provide the corresponding weight to the WRR arbiter 60. The WRR arbiter 60 may use the weights for each context identifier to arbitrate among the contexts for transmitting instructions to the coprocessor 14. The arbitration among the threads/contexts may thus be on a fine-grain level, e.g., per instruction or bundle of instructions.

Figure 7:
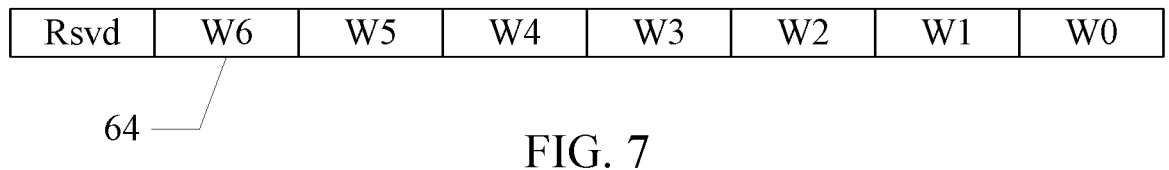
FIG. 7 is a block diagram illustrating one embodiment of mapping priorities to weights.

FIG. 7 is a block diagram illustrating one embodiment of the fields in the weights register 64 and a table 70 illustrating the mapping of context priority values to indexes into the fields. In the illustrated embodiment, context priority values may be 8 bits (and thus may have values from 0 to 255). A priority of 255 is highest and a priority of zero is the lowest in this embodiment. Other embodiments may use other numbers of bits and thus the range of context priority values may vary. As illustrated in FIG. 7, continuous ranges of priority values may map to a given index. For example, context priority values 15-0 map to index 6, priority values 31-15 map to index 5, etc. Field 6 stores a weight W6, field 5 stores a weight W5, etc. Each field may also be 8 bits in this embodiment, and a final field that would correspond to index 7 may not be used (Rsvd in FIG. 7). Thus, the arbiter (and more particularly the priority-weight mapper 62) may be configured to map a plurality of ranges of the coprocessor priorities to the plurality of weights, wherein priorities within a given range of the plurality of ranges map to a same weight of the plurality of weights In an embodiment, the ranges of context priority that map from to fields in the weights register 64 may not be a constant size (or width). That is, the ranges may differ in size, or at least one of the plurality of ranges may differ from at least one other one of the plurality of ranges. For example, 16 context priority values (15-0) map to index 6 and 16 context priority values (31-16) map to index 5. However, 32 context priority values (63-32) map to index 4 and 32 context priority values (95-64) map to index 3. Sixty-four context priority values (159-96) map to index 2, and 64 context priority values (223-160) map to index 1. Finally, 32 context priority values (255-224) map to index 0. Accordingly, the ranges increase as priority values increase, with the exception of the highest priority range because the range of priority values has ended. That is, the range the includes the maximum value (e.g., mapped to index 0) may be larger than the range that includes the minimum value (e.g., mapped to index 6). One or more intermediate ranges (e.g., the range mapped to index 4) may be larger than the range that includes the minimum value and smaller than a range having larger context priority values (e.g., the range mapped to index 1). The ranges may generally have the property that doubling a given priority value to a second priority value will map to a different weight. For example, doubling of the context priority value from 10 to 20 results in a different weight, as does the doubling of the context priority from 100 to 200.

The weights are stored in a register 64 in this embodiment, and thus may be programmable. In an embodiment, the programmability may allow for tuning of the weights and the finally-determined weights may be fused into the integrated circuit that implements the processor cluster or even fused into the register 64. Alternatively, the weights may be written to the register 64 during system initialization (or "boot"). The boot code may read the selected weights from a non-volatile memory to write the register 64.

While the weights are programmable, one use case includes increasing the weights from right (W0) to left (W7). Thus, W0 (mapped from the range 255-224 of context priority values) may be smallest (or most frequently selected), W1 may be next smallest, etc. In an embodiment, the weights may increase by a power of two. For example, weight W0 may be 1, weight W1 may be 2, weight W3 may be 4, etc. Other embodiments may use other weights as well. Thus, the plurality of weights may be inversely proportional to the context priority values.

Figure 8:
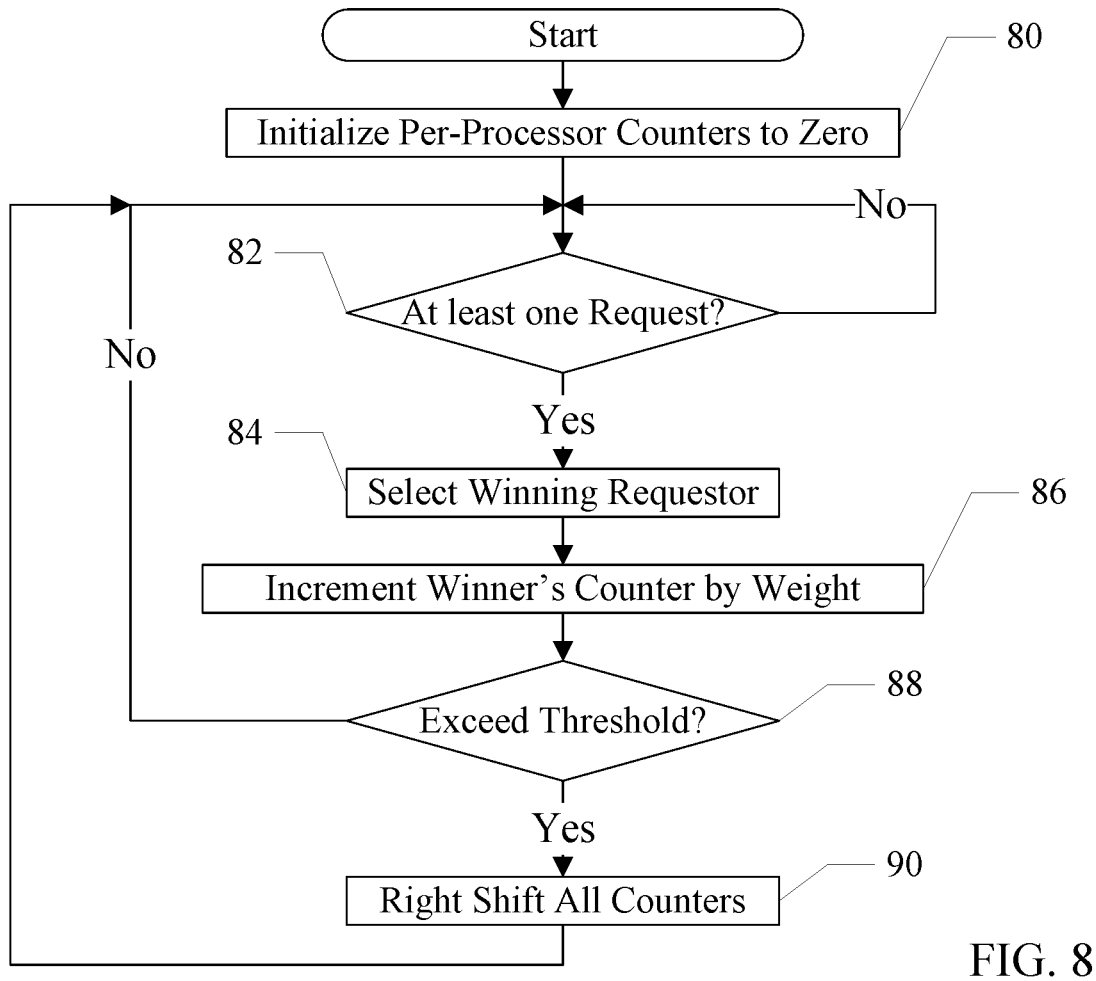
FIG. 8 is a flowchart illustrating operation of one embodiment of a weighted round-robin arbiter.

FIG. 8 is a flowchart illustrating operation of one embodiment of the WRR arbiter 60. While the blocks are shown in a particular order for ease of understanding, other orders may be used. Blocks may be performed in parallel in combinatorial logic in the WRR arbiter 60. Blocks, combinations of blocks, and/or the flowchart as a whole may be pipelined over multiple clock cycles. The WRR arbiter 60 may be configured to implement the operation illustrated in FIG. 8.

The WRR arbiter 60 may include a counter for each requestor. At power up, the WRR 60 may initialize the counters to zero (block 80). In a given arbitration round, the WRR arbiter 60 may determine if there is a least one request active (e.g., at least one processor 10A-10N has outstanding instructions issued for the coprocessor 14 that have not been selected by the WRR arbiter 60 and sent to the coprocessor 14). If there is no request active (decision block 82, "no" leg) the WRR arbiter 60 may be idle for the current arbitration cycle. If there is at least one request active (decision block 82, "yes" leg), the WRR arbiter 60 may select a winning requestor (block 84). The WRR arbiter 60 may favor the requestor having the lowest counter value. For example, the requestor that has an active request and has a lower counter value than other requestors with active requests may be selected. If two or more requestors with active requests have the same counter value and it is lowest, the WRR arbiter 60 may select any one of the requestors (e.g., randomly, using least recently granted, using context id value, etc.). The WRR arbiter 60 may increment the winning requestor's counter by the weight corresponding to the winning requestor (e.g., the weight assigned to the corresponding context ID) (block 86). If the incremented count exceeds a threshold (decision block 88, "yes" leg), the WRR arbiter 60 may write shift the counters, dividing the current counts by two (block 90). In either case (decision block 88, "yes" and "no" legs), the arbitration round is complete the WRR arbiter 60 may return to decision block 82 for the next arbitration round.

Figure 9:
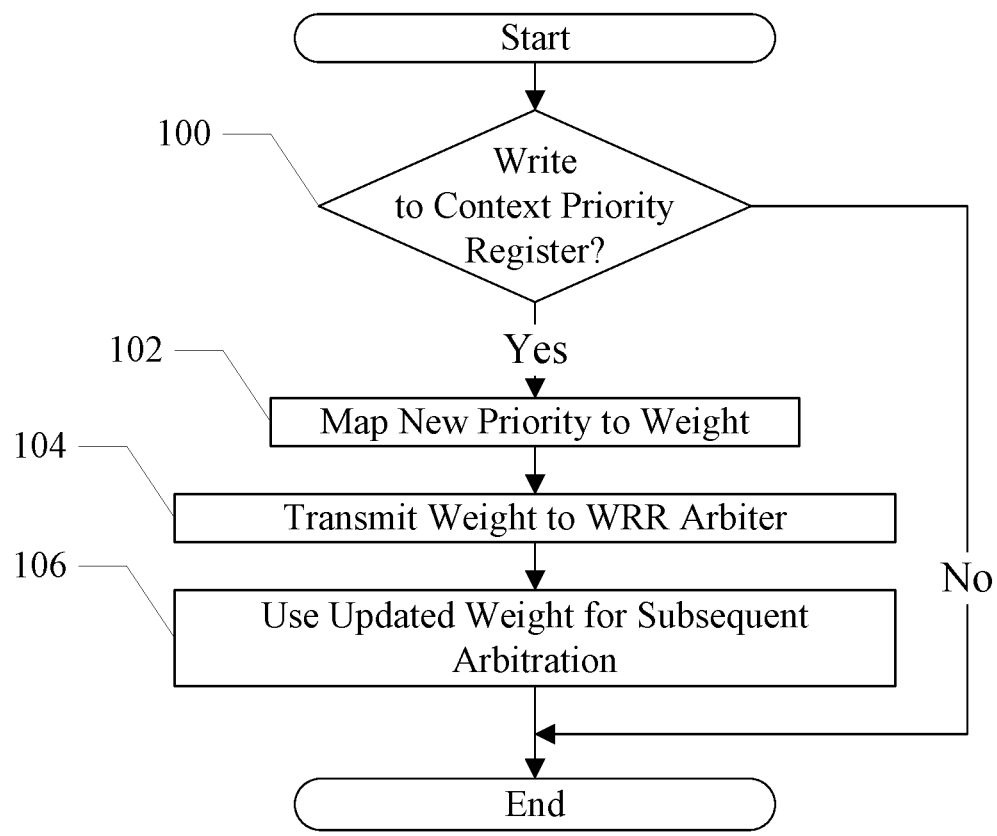
FIG. 9 is a flowchart illustrating operation of one embodiment of the processor cluster shown in FIG. 6 in response to an update to a context priority register.

FIG. 9 is a flowchart illustrating operation of one embodiment of the WRR arbiter 60 and the priority-weight mapper 62 when a processor 10A-10N writes a new context priority to one of the coprocessor context priority registers 16A-16N. While the blocks are shown in a particular order for ease of understanding, other orders may be used. Blocks may be performed in parallel in combinatorial logic in the WRR arbiter 60/priority-weight mapper 62. Blocks, combinations of blocks, and/or the flowchart as a whole may be pipelined over multiple clock cycles. The WRR arbiter 60/priority-weight mapper 62 may be configured to implement the operation illustrated in FIG. 8.

Responsive to detecting a write to a coprocessor context priority register 16A-16N (decision block 100, "yes" leg), the priority-weight mapper 62 may map the new context priority value to the corresponding weight (block 102) and may transmit the weight to the WRR arbiter 60 (block 104). The WRR arbiter 60 may update the weight for the corresponding context and may use the updated weight in subsequent arbitrations (block 106). Accordingly, even if the corresponding counter has a high value, the counter may subsequently be right shifted enough times that the new weight will begin having an effect on how frequently the corresponding thread wins arbitration. Alternatively, the corresponding counter may be reset when the weight is updated, or may be reset if the updated weight is lower than the previous weight but not reset if the new weight is higher than the previous weight.

Figure 10:
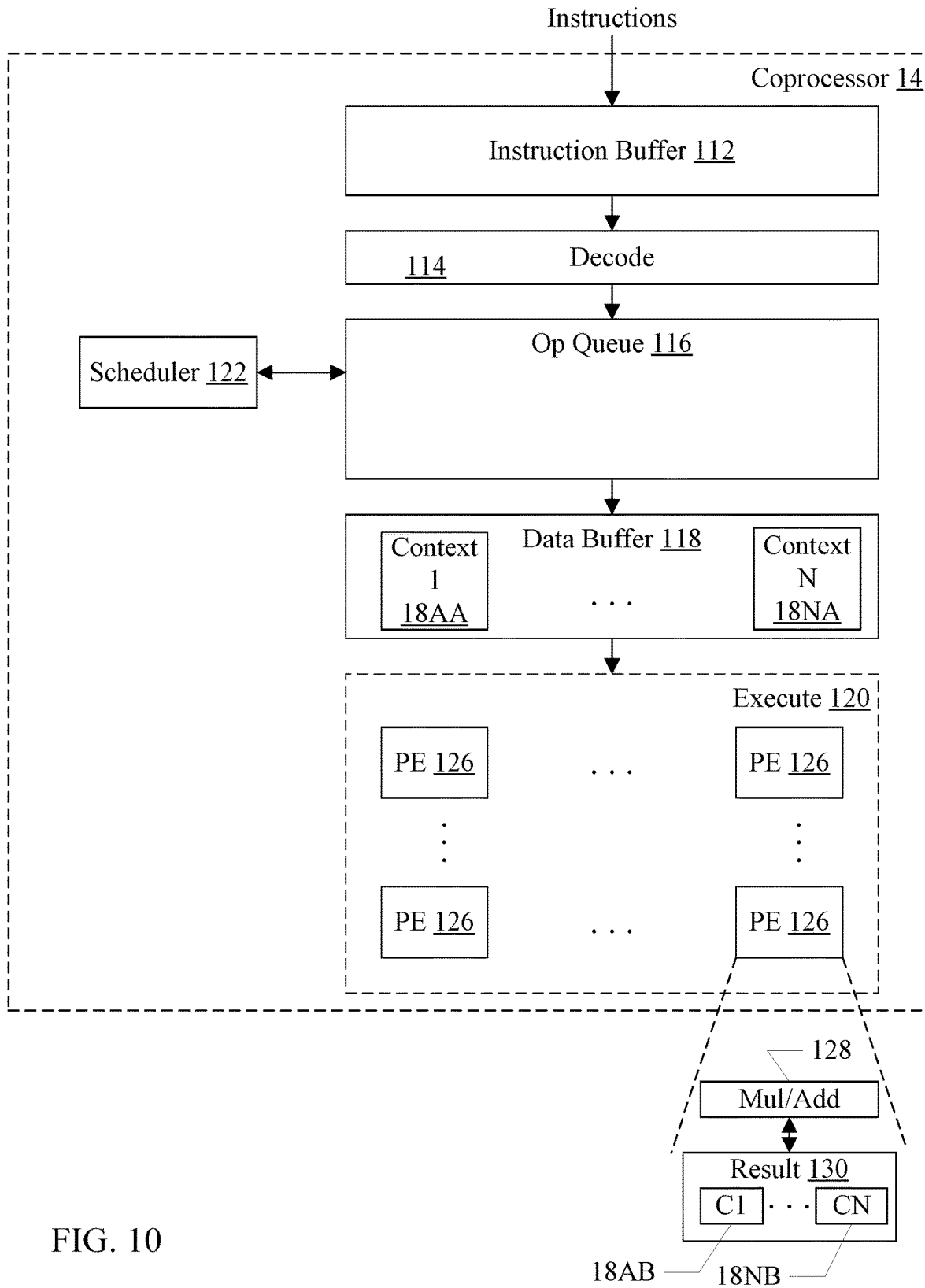
FIG. 10 is a block diagram of one embodiment of a coprocessor in more detail.

Turning now to FIG. 10, a block diagram of one embodiment of the coprocessor 14 is shown in greater detail. In the illustrated embodiment, the coprocessor 14 includes an instruction buffer 112, a decode unit 114, an operation (op) queue 116, a data buffer 118, an execute circuit 120, and a scheduler circuit 122. The instruction buffer 112 is coupled to receive instructions to be executed by the coprocessor 14, and is coupled to the decode unit 114. More particularly, the instruction buffer 112 may receive instructions issued from the processors 10A-10N, as selected through the coprocessor arbiter 12. The decode unit 114 is coupled to the op queue 116, which is further coupled to the data buffer 118. The data buffer 118 is coupled to the execute circuit 120.

The decode unit 114 may decode the instructions from the instruction buffer 112 into one or more operations (ops) for execution. The ops may include compute ops that are executed in the execute circuit 120, as well as memory ops to read data from memory into the data buffer 118 and store data from the data buffer 118 to memory. In one embodiment, the data buffer 118 may be the source of operands for compute ops executed by the execute circuit 120, and results may be stored in a second data buffer that is distributed within the execute circuit 120. For example, the one of the processing elements (PEs) 126 is illustrated in exploded view in FIG. 10 and includes a multiply-add circuit 128 and a result buffer 130. In other embodiments, results may be written to the data buffer 118 as well. The data buffer 118 and the result buffer 130 include separate storage for each context 18A-18N. For example, storage for context 18A (reference numeral 18AA) and context 18N (reference numeral 18NA) in the data buffer 118 is shown, as is storage for context 18A (reference numeral 18AB) and the context 18N (reference numeral 18NB) in the result buffer 130. Together, the storage 18AA and the storage 18AB may form the context 18A, and the storage 18NA and the storage 18NB may form the context 18N. Other context storage may be included in the coprocessor 14 in other embodiments as well.

The coprocessor 14 may be designed to execute instructions which specify vectors of operands and a compute operation to be performed on the operands. For example, various types of multiply/accumulate operations may be supported. The multiplications may be performed in parallel on the vectors of operands. Thus, the execute circuit 120 includes an array of PEs 126. The array of PEs 126 may include a horizontal direction and a vertical direction, as illustrated in FIG. 10. Each PE 126 may receive an operand from one or more input vectors for an op, and may perform the specified compute operation on the operand to produce a result. Some ops may specify a vector of results, and a subset of the PEs 126 may be used for such ops. Other ops may specify an array of results. For example, in an embodiment, the multiply-accumulate operations over the vectors of input operands may produce an outer product of the vectors. Up to all of the PEs 126 may be used for such ops. However, in some cases, even the array of results may not use all of the PEs 126. For example, various operand sizes may be supported. Smaller operand sizes have more operands in a given amount of storage and thus may use more of the PEs 126 than larger operand sizes. Additionally, in some cases, not all of the vector of input operands may be used. Accordingly, ops may cause a variable amount of activity in the execute circuit 120 and thus a variable amount of change in power consumption as ops are issued into the execute pipeline implemented by the execute circuit 120. As illustrated in the exploded view in FIG. 10, each PE may include a multiply-add circuit 128, and thus the coprocessor comprises an array of multiply-add circuits configured to perform a plurality of multiply-add operations on independent elements of operand data in response to a coprocessor instruction.

The op queue 116 stores the ops until the ops may be executed by the execute circuit 120. Each entry in the op queue 116 may include the op (including the operand specifiers identifying locations in the data buffer 18 from which the operands will be read, destination specifiers, context ID, etc.). The ops may wait for their operands to be ready, for example, and may be selected for issue to the execute circuit 120 once the operands are available (e.g., in the data buffer 118 or for bypass as the ops issue to the data buffer 118 and read their operands). Other conditions may control issue as well, e.g., older ops may be favored for issue over younger ops, etc. The scheduler circuit 122 may be responsible for determining which ops are available to issue and scheduling the ops for issue.

System

Figure 11:
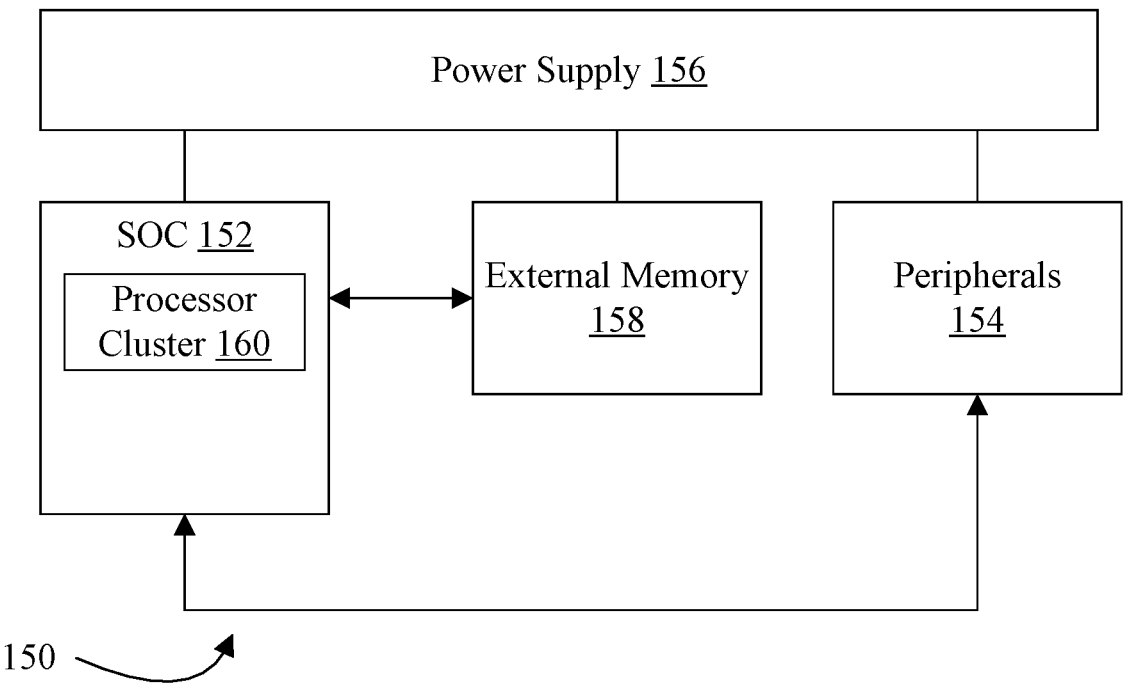
FIG. 11 is a block diagram of one embodiment of a system

Turning next to FIG. 11, a block diagram of one embodiment of a system 150 is shown. In the illustrated embodiment, the system 150 includes at least one instance of a system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of a processor cluster 160. For example, a processor cluster 160 may be a cluster such as that illustrated in FIG. 1 and/or FIG. 6.

The peripherals 154 may include any desired circuitry, depending on the type of system 150. For example, in one embodiment, the system 150 may be a mobile device (e.g., personal digital assistant (PDA), smart phone, etc.) and the peripherals 154 may include devices for various types of wireless communication, such as Wi-Fi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g., desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Computer Readable Storage Medium

Figure 12:
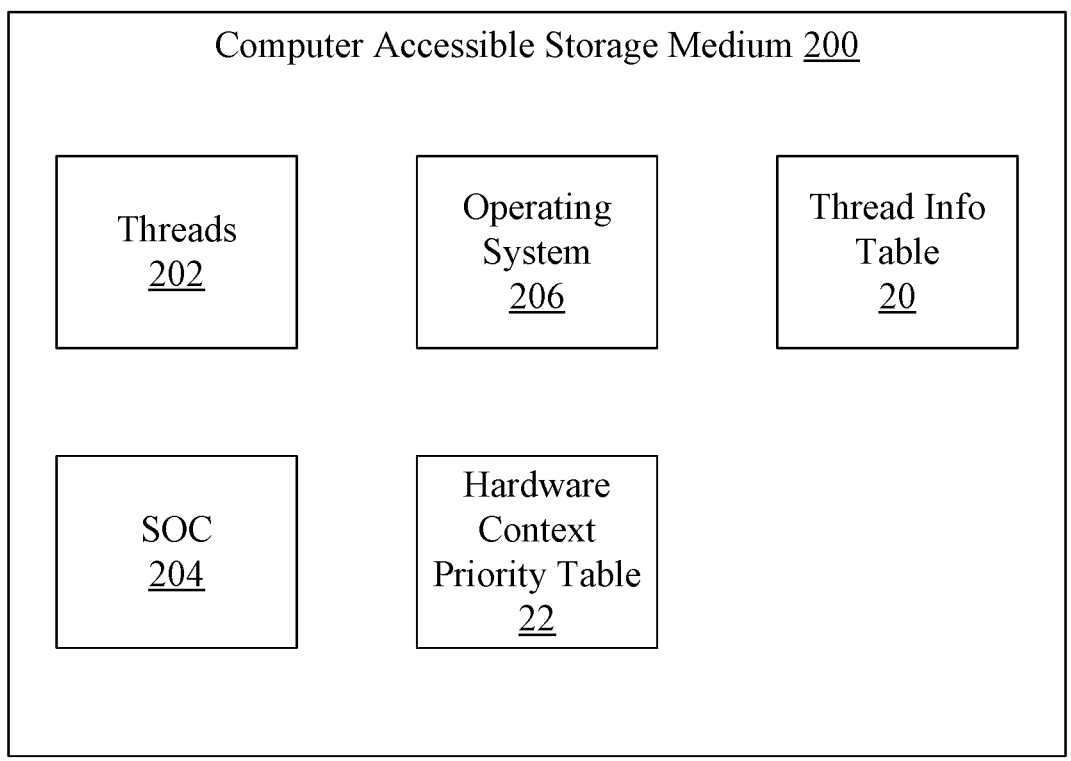
FIG. 12 is a block diagram of one embodiment of a computer accessible storage medium.

Turning now to FIG. 12, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

In an embodiment, the computer accessible storage medium may store one or more of threads 202, an operating system 206, the thread information table 20, and/or the hardware context priority table 22. The threads 202 may comprise instructions to be executed by the processors 10A-10N and/or the coprocessor 14, in an embodiment. The operating system 206 may similarly include instructions to be executed by the processors 10A-10N, to schedule the threads 202 for execution and control access to other system resources such as the peripherals 254 (and on-chip peripherals in the SOC 152, if any), the memory 158, and the coprocessor 14. The operating system 206 may include instructions which, when executed on processors 10A-10N, implement the operation illustrated in FIGS. 3-5.

In another embodiment, the computer accessible storage medium 200 in FIG. 12 may store a database 204 representative of the SOC 152. Generally, the database 204 may be a database which can be read by a program and used, directly or indirectly, to fabricate the hardware comprising the SOC 152. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 152. The netlist may then be placed and routed to produce a data set describing geometric shapes to be applied to masks. The masks may then be used in various semiconductor fabrication steps to produce a semiconductor circuit or circuits corresponding to the SOC 152. Alternatively, the database 204 on the computer accessible storage medium 200 may be the netlist (with or without the synthesis library) or the data set, as desired.

While the computer accessible storage medium 200 stores a representation of the SOC 152, other embodiments may carry a representation of any portion of the SOC 152, as desired, including the processor cluster 160, any subset of the processor cluster 160 or portions thereof, etc. The database 204 may represent any portion of the above.

In accordance with the above description, a system may comprise a plurality of processors, a coprocessor coupled to the plurality of processors, a plurality of coprocessor context registers, and an arbiter coupled to the plurality of processors and the coprocessor. The coprocessor is configured to execute coprocessor instructions transmitted by the plurality of processors, wherein the coprocessor instructions are included in threads with processor instructions to be executed by the plurality of processors. The coprocessor may include a plurality of contexts to permit simultaneous multi-threaded execution on the coprocessor. A given coprocessor context priority register of the plurality of coprocessor context priority registers corresponds to a respective context of the plurality of contexts, and wherein a context priority programmed into the given coprocessor context priority register specifies a priority of a thread executing in the respective context for execution bandwidth on the coprocessor. The arbiter is configured to arbitrate between coprocessor instructions from the plurality of processors to select coprocessor instructions to be transmitted to the coprocessor for execution based on the context priorities programmed into the plurality of coprocessor context priority registers. In an embodiment, the arbiter may be configured to implement a weighted round robin arbitration. In an embodiment, the arbiter may be configured to map the context priorities from the plurality of coprocessor context priority registers to a plurality of weights. In an embodiment, the arbiter may be configured to map a plurality of ranges of the coprocessor priorities to the plurality of weights. Priorities within a given range of the plurality of ranges may map to a same weight of the plurality of weights. In an embodiment, at least one of the plurality of ranges differs in size from at least another one of the plurality of ranges. In an embodiment, a first range of the plurality of ranges includes a maximum value of the context priorities and is larger in size than a second range of the plurality of ranges that includes a minimum value of the context priorities. In an embodiment, a third range of the plurality of ranges is smaller in size than a fourth range of the plurality of ranges and larger in size than the second range. In an embodiment, the plurality of weights may be inversely proportional to the context priorities. In an embodiment, the coprocessor comprises an array of multiply-add circuits configured to perform a plurality of multiply-add operations on independent elements of operand data in response to a coprocessor instruction.

In an embodiment, a system may comprise a plurality of processors; a coprocessor coupled to the plurality of processors, a plurality of coprocessor context priority registers, and an arbiter coupled to the plurality of processors and the coprocessor. The coprocessor may be configured to execute coprocessor instructions transmitted by the plurality of processors, and the coprocessor may include a plurality of contexts. A given coprocessor context priority register of the plurality of coprocessor context priority registers corresponds to a respective context of the plurality of contexts, and a context priority programmed into the given coprocessor context priority register specifies a priority of a thread executing in the respective context for execution bandwidth on the coprocessor. The arbiter may be configured to arbitrate between coprocessor instructions from the plurality of processors to select coprocessor instructions to be transmitted to the coprocessor for execution based on the context priorities programmed into the plurality of coprocessor context priority registers. A computer accessible storage medium coupled to the plurality of processors and configured to store a plurality of instructions which, when executed by one or more of the plurality of processors, cause the system to implement a plurality of operations comprising: programming an initial plurality of priorities corresponding to a plurality of threads that include coprocessor instructions, the initial priorities recorded in a table from which the plurality of coprocessor context priority registers are programmed when corresponding threads of the plurality of threads are executed on the plurality of processors; monitoring operation of the plurality of threads; and based on the operation of the plurality of threads, dynamically modifying one or more of the initial plurality of priorities. In an embodiment, a first thread of the plurality of threads has a deadline for completion, and wherein a first priority of the initial plurality of priorities is derived from the deadline. In an embodiment, dynamically modifying one or more of the initial plurality of priorities is based on the first thread completing execution within a threshold of the deadline. In an embodiment, the threshold is measured based on an average duty cycle of the first thread observed in the monitoring. In an embodiment, a second thread of the plurality of threads has a software-assigned priority, and wherein a corresponding initial priority of the initial plurality of priorities is mapped from the software-assigned priority. During a context switch to a first context on a first processor of the plurality of processors, a second plurality of instructions executed by the first processor cause the first processor to write a first context priority corresponding to the first context to a first coprocessor context priority register of the plurality of coprocessor context priority registers.

In an embodiment, a method may comprise programming a plurality of coprocessor context priority registers. A given coprocessor context priority register of the plurality of coprocessor context priority registers corresponds to a respective context of a plurality of contexts in the coprocessor. A context priority programmed into the given coprocessor context priority register may specify a priority of a thread executing in the respective context for execution bandwidth on the coprocessor. The method may further comprise arbitrating between coprocessor instructions from the plurality of processors to select coprocessor instructions to be transmitted to the coprocessor for execution based on the context priorities programmed into the plurality of coprocessor context priority registers. In an embodiment, the method may further comprise mapping the context priorities from the plurality of coprocessor context priority registers to a plurality of weights. In an embodiment, the mapping may comprise mapping a plurality of ranges of the coprocessor priorities to the plurality of weights, wherein priorities within a given range of the plurality of ranges map to a same weight of the plurality of weights. In an embodiment, at least one of the plurality of ranges differs in size from at least another one of the plurality of ranges. In an embodiment, a first range of the plurality of ranges includes a maximum value of the context priorities and is larger in size than a second range of the plurality of ranges that includes a minimum value of the context priorities.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
    a plurality of processors;
    a coprocessor coupled to the plurality of processors and configured to execute coprocessor instructions transmitted by the plurality of processors, and wherein the coprocessor includes a plurality of contexts;
    a plurality of coprocessor context priority registers, wherein a given coprocessor context priority register of the plurality of coprocessor context priority registers corresponds to a respective context of the plurality of contexts, and wherein a context priority programmed into the given coprocessor context priority register specifies a priority of a thread executing in the respective context for execution bandwidth on the coprocessor;
    an arbiter coupled to the plurality of processors and the coprocessor and configured to arbitrate between coprocessor instructions from the plurality of processors to select coprocessor instructions to be transmitted to the coprocessor for execution based on the context priorities programmed into the plurality of coprocessor context priority registers; and
    a computer accessible storage medium coupled to the plurality of processors and configured to store a plurality of instructions which, when executed by one or more of the plurality of processors, cause the system to implement a plurality of operations comprising:
        programming an initial plurality of context priorities in a table, wherein the initial plurality of context priorities correspond to a plurality of threads that include coprocessor instructions;
        programming a particular coprocessor context priority register of the plurality of coprocessor context priority registers based on a given thread of the plurality of threads executing on a corresponding processor of the plurality of processors, wherein programming the particular coprocessor context priority register comprises reading a corresponding priority from the table for the given thread and writing the corresponding priority to the particular coprocessor context priority register;

monitoring operation of the plurality of threads; and based on the operation of the plurality of threads, dynamically modifying one or more of the initial plurality of context priorities in the table.

2. The system as recited in claim 1 wherein a first thread of the plurality of threads has a deadline for completion, and wherein a first context priority of the initial plurality of context priorities is derived from the deadline.

3. The system as recited in claim 2 wherein dynamically modifying one or more of the initial plurality of context priorities is based on the first thread completing execution within a threshold of the deadline.

4. The system as recited in claim 3 wherein the threshold is measured based on an average duty cycle of the first thread observed in the monitoring.

5. The system as recited in claim 2 wherein a second thread of the plurality of threads has a software-assigned context priority, and wherein a corresponding initial context priority of the initial plurality of context priorities is mapped from the software-assigned context priority.

6. The system as recited in claim 1 wherein, during a context switch to a first context on a first processor of the plurality of processors, a second plurality of instructions executed by the first processor cause the first processor to write a first context priority corresponding to the first context to a first coprocessor context priority register of the plurality of coprocessor context priority registers.

7. The system as recited in claim 1 wherein the arbiter is configured to implement a weighted round robin arbitration, and wherein the arbiter is configured to map the context priorities from the plurality of coprocessor context priority registers to a plurality of weights.

8. The system as recited in claim 7 wherein the arbiter is configured to map a plurality of ranges of the coprocessor context priorities to the plurality of weights, wherein context priorities within a given range of the plurality of ranges map to a same weight of the plurality of weights.

9. The system as recited in claim 8 wherein at least one of the plurality of ranges differs in size from at least another one of the plurality of ranges.

10. The system as recited in claim 8 wherein a first range of the plurality of ranges includes a maximum value of the context priorities and is larger in size than a second range of the plurality of ranges that includes a minimum value of the context priorities.

11. The system as recited in claim 10 wherein a third range of the plurality of ranges is smaller in size than a fourth range of the plurality of ranges and larger in size than the second range.

12. The system as recited in claim 8 wherein the plurality of weights are inversely proportional to the context priorities.

13. A method comprising:

programming an initial plurality of context priorities in a table, wherein the initial plurality of context priorities correspond to a plurality of threads that include coprocessor instructions, wherein the coprocessor instructions are executed by a coprocessor coupled to a plurality of processors, wherein the coprocessor includes a plurality of contexts that correspond to a plurality of coprocessor context priority registers, and wherein a context priority programmed into a given coprocessor context priority register specifies a priority for execution bandwidth on the coprocessor, the priority corresponding to a thread executing in a respective context of the plurality of contexts;

programming a particular coprocessor context priority register of the plurality of coprocessor context priority registers based on a given thread of the plurality of threads executing on the plurality of processors, wherein programming the particular coprocessor context priority register comprises reading a corresponding priority from the table for the given thread and writing the corresponding priority to the particular coprocessor context priority register;

arbitrating between coprocessor instructions from the plurality of processors to select coprocessor instructions to be transmitted to the coprocessor for execution based on the context priorities programmed into the plurality of coprocessor context priority registers;

monitoring operation of the plurality of threads; and based on the operation of the plurality of threads, dynamically modifying one or more of the initial plurality of context priorities in the table.

14. The method as recited in claim 13 wherein a first thread of the plurality of threads has a deadline for completion, and the method further comprises deriving a first context priority of the initial plurality of context priorities from the deadline.

15. The method as recited in claim 14 wherein dynamically modifying one or more of the initial plurality of context priorities is based on the first thread completing execution within a threshold of the deadline.

16. The method as recited in claim 15 wherein the threshold is measured based on an average duty cycle of the first thread observed in the monitoring.

17. The method as recited in claim 14 wherein a second thread of the plurality of threads has a software-assigned priority, and the method further comprises mapping a corresponding initial context priority of the initial plurality of context priorities from the software-assigned priority.

18. The method as recited in claim 13 wherein the arbitrating is based on a weighted round robin arbitration, and the method further comprises mapping the context priorities from the plurality of coprocessor context priority registers to a plurality of weights.

19. The method as recited in claim 18 wherein the mapping comprises mapping a plurality of ranges of the coprocessor context priorities to the plurality of weights, wherein coprocessor context priorities within a given range of the plurality of ranges map to a same weight of the plurality of weights.

20. A system comprising:

a plurality of processors;

a coprocessor coupled to the plurality of processors and configured to execute coprocessor instructions transmitted by the plurality of processors, wherein the coprocessor instructions are included in threads with processor instructions to be executed by the plurality of processors, and wherein the coprocessor includes a plurality of contexts, and wherein a respective context of the plurality of contexts corresponds to a respective processor of a plurality of processors, and wherein the coprocessor comprises separate state for the respective contexts to ensure independent, concurrent execution of coprocessor instructions from different threads;

a plurality of coprocessor context priority registers, wherein a given coprocessor context priority register of the plurality of coprocessor context priority registers corresponds to the respective context of the plurality of contexts, and wherein a context priority programmed into the given coprocessor context priority register specifies a priority of a thread executing in the respective context for execution bandwidth on the coprocessor; and an arbiter coupled to the plurality of processors and the coprocessor and configured to arbitrate between coprocessor instructions from the plurality of processors to select coprocessor instructions to be transmitted to the coprocessor for execution based on the context priorities programmed into the plurality of coprocessor context priority registers.

\* \* \* \* \*